(No Model.)
J. E. DRAKELEY.
BED PAN.
No. 297,119. Patented Apr. 22, 1884.
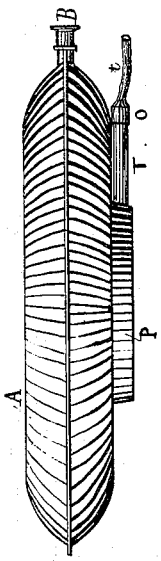
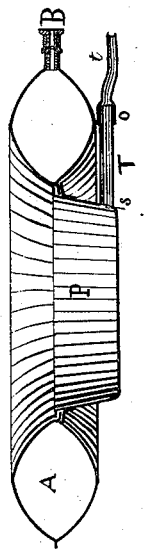
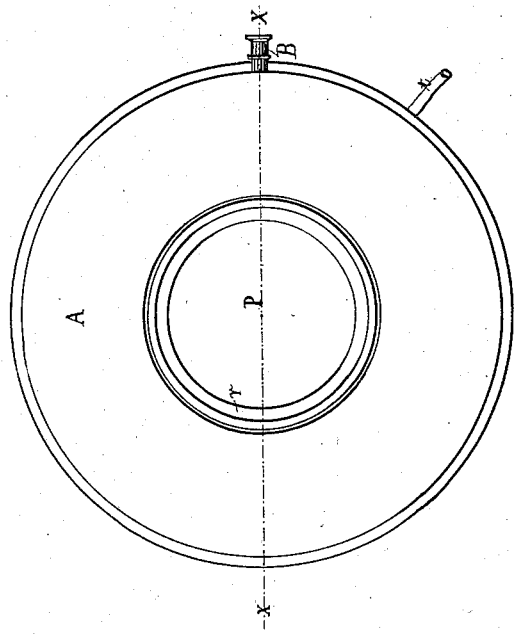
WITNESSES:
D. W. Smith
C. E. Buell
INVENTOR
Julia E. Drakeley
BY Philip H. Perkins
ATTORNEY

UNITED STATES PATENT OFFICE.

JULIA E. DRAKELEY, OF MADISON, WISCONSIN.

BED-PAN.

SPECIFICATION forming part of Letters Patent No. 297,119, dated April 22, 1884.

Application filed November 3, 1883. (No model.)

*To all whom it may concern:*

Be it known that I, JULIA E. DRAKELEY, a citizen of the United States, residing at Madison, in the county of Dane and State of Wisconsin, have invented a new and useful Bed-Pan, of which the following is a specification.

My invention relates to improvements in bed-pans in which an ordinary annular rubber air-cushion is used in combination with an ordinary shaped pan of tin or any metal or substance desired, as will be more particularly described hereinafter.

The object of my improvement is to support the body of the person using the contrivance in an elevated position, so that the excrement, when ejected, will not flow down the back. Another object of my improvement is to add to the general comfort and convenience of the invalid, as well as to lessen the labor of cleaning and readjusting after use. I attain these objects by the contrivance illustrated in the accompanying drawings, in which—

Figure 1 is a vertical longitudinal section of the entire machine, taken through x x, Fig. 4. Fig. 2 is a side view. Fig. 3 is a vertical section of the pan as shown in Fig. 1, with the cushion removed. Fig. 4 is a top view of the machine.

Similar letters refer to similar parts throughout the several views.

A is an ordinary annular rubber air-cushion, which may be inflated at B. The pan P is an ordinary tin pan or basin, except that it has an extra rim or flange, *f f*, which must be wide enough to hold the cushion A in position after it is adjusted over the rim *r r*. When thus adjusted, the flexible inner rim of the air-cushion A fits closely around the pan between the flanges *r* and *f*. At the time of adjustment the cushion A may be inflated or not, at pleasure. The pan P is provided with a soft-rubber evacuating-tube, *t*, of any desired length, attached at *o* to a short permanent tin tube, T, which is soldered into the pan P at *s*. This tube, in combination with the rubber tube, is to be used for conveying away fluid excretions.

My improved bed-pan is to be used in the following manner: The annular rubber air-cushion A having been attached to the pan P, as shown in Figs. 1 and 3, and distended with air, partially or completely, as desired, the bed-pan, with cushion attached, is placed under the body, which may remain in a horizontal position. When, however, the condition of the patient admits, it will be found equally convenient, if desirable, to place the body in an upright or sitting position on the bed-pan. In either case the excrement is deposited in the pan P. If fluid, it is conveyed away at once through the soft-rubber evacuating-tube *t*, after which the cushion A and the pan P are easily detached and cleaned separately.

I am aware that prior to my invention rubber air-cushions, substantially as described, have been in common use. This part of my bed-pan I do not claim as patentable.

I am also aware that the pan P, with the evacuating-tube *t*, is not, aside from the extra flange *f*, new and patentable; but What I do claim as my invention, and desire to secure by Letters Patent, is—

The combination of the pan P, provided with the extra flange *f*, with the annular rubber air-cushion A, substantially and for the purposes as described.

JULIA E. DRAKELEY.

Witnesses:
PHILIP H. PERKINS,
D. W. SMITH.